United States Patent
Zhang et al.

(10) Patent No.: US 12,066,628 B2
(45) Date of Patent: Aug. 20, 2024

(54) IMAGE DISPLAY METHOD, IMAGE DISPLAY DEVICE AND READABLE STORAGE MEDIUM

(71) Applicant: GOERTEK INC., Shandong (CN)

(72) Inventors: Zhe Zhang, Shandong (CN); Bin Jiang, Shandong (CN); Xiaoyu Chi, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/322,920

(22) Filed: May 24, 2023

(65) Prior Publication Data

US 2023/0296896 A1    Sep. 21, 2023

Related U.S. Application Data

(63) Continuation-in-part of application No. PCT/CN2020/136644, filed on Dec. 16, 2020.

(30) Foreign Application Priority Data

Nov. 24, 2020 (CN) .................. 202011334333.X

(51) Int. Cl.
*G02B 27/01* (2006.01)
*G09G 3/00* (2006.01)

(52) U.S. Cl.
CPC ........... *G02B 27/017* (2013.01); *G09G 3/007* (2013.01); *G02B 2027/0112* (2013.01); *G02B 2027/0138* (2013.01); *G02B 2027/014* (2013.01); *G09G 2340/16* (2013.01)

(58) Field of Classification Search
CPC ...... G02B 2027/014; G02B 2027/0112; G02B 2027/0138; G02B 27/017; G09G 3/007
See application file for complete search history.

(56) References Cited

U.S. PATENT DOCUMENTS

2013/0120473 A1    8/2013   Weigand
2016/0217621 A1*   7/2016   Raghoebardajal ... H04N 13/366

FOREIGN PATENT DOCUMENTS

| CN | 101290746 A | 10/2008 |
| CN | 102253560 A | 11/2011 |
| CN | 103218964 A | 7/2013 |
| CN | 103426407 A | 12/2013 |
| CN | 104123906 A | 10/2014 |

(Continued)

OTHER PUBLICATIONS

International Search Report from International Application No. PCT/CN2020/136644 mailed Apr. 27, 2021.

*Primary Examiner* — Abbas I Abdulselam
(74) *Attorney, Agent, or Firm* — Shih IP Law Group, PLLC

(57) ABSTRACT

An image display method, an image display device, and a readable storage medium are disclosed. The image display method applied to a headset display device comprises: controlling the camera to capture a display image, comparing the display image with a corresponding reference image, to obtain a pixel point of the display image that is changed relative to the reference image, wherein the reference image is a previous frame image of the display image captured by the camera (S10); obtaining pixel information of the pixel point according to the changed pixel point (S20); and refreshing the changed pixel point to the display screen according to the pixel information (S30).

20 Claims, 5 Drawing Sheets

(56) References Cited

FOREIGN PATENT DOCUMENTS

| | | | |
|---|---|---|---|
| CN | 104537971 | A | 4/2015 |
| CN | 104994153 | A | 10/2015 |
| CN | 107479278 | A | 12/2017 |
| CN | 111477147 | A | 7/2020 |

* cited by examiner

IMAGE DISPLAY METHOD, IMAGE DISPLAY DEVICE AND READABLE STORAGE MEDIUM

The present disclosure claims a priority of a Chinese Patent Application No. 202011334333.X, titled "image display method, image display device and readable storage medium" filed in China Patent Office on Nov. 24, 2020, the entire contents of which are combined into the present disclosure by reference.

TECHNICAL FIELD

The present disclosure relates to a technical field of image display, and in particular to an image display method, an image display device and a readable storage medium.

DESCRIPTION OF RELATED ART

Currently, the process of displaying an image on a display is to refresh the entire image onto the screen by a progressive row by row scanning manner. However, in some cases, only individual pixel points are changed in the image, or even a single pixel point is changed. Thus, refreshing the entire display image leads to circumstances that refresh efficiency is slow, refresh delay is prone to occur, and the display picture is prone to be stuck.

SUMMARY

Based on this, for the current problems that refresh efficiency is slow, refresh delay is prone to occur, and the display picture is prone to be stuck, which are cause by refreshing the entire image, it is necessary to provide an image display method, an image display device and a readable storage medium to effectively improve the refresh speed, reduce the refresh delay, and prevent stuck of the display picture.

To achieve the above objects, the present disclosure provides an image display method applied to a headset display device, wherein the headset display device comprises a camera and a display screen, the camera is used for capturing a display image to be displayed by the display screen, the image display method comprising flowing steps:

controlling the camera to capture a display image, comparing the display image with a corresponding reference image, to obtain a pixel point of the display image that is changed relative to the reference image, wherein the reference image is a previous frame image of the display image captured by the camera;

obtaining pixel information of the pixel point according to the changed pixel point; and refreshing the changed pixel point to the display screen according to the pixel information.

Besides, for achieving the above objects, the present disclosure also provides a headset display device, wherein the headset display device comprises a camera and a display screen, the camera is used for capturing a display image to be displayed by the display screen, the headset display device further comprises a storage for storing program code and a processer for performing following operations according to the program code:

controlling the camera to capture a display image, comparing the display image with a corresponding reference image, to obtain a pixel point of the display image that is changed relative to the reference image, wherein the reference image is a previous frame image of the display image captured by the camera;

obtaining pixel information of the pixel point according to the changed pixel point and refreshing the changed pixel point to the display screen according to the pixel information.

Besides, for achieving the above objects, the present disclosure also provides a computer readable storage medium on which an image display program is stored, and when the image display program is executed by a processor, the above-described image display method is implemented.

In the technical solution proposed in the present disclosure, the pixel point of the display image that is changed relative to the reference image is obtained by comparing the display image captured by the camera with the reference image. After obtaining the pixel information of the changed pixel point, only the changed pixel point is refreshed according to the pixel information when refreshing the display screen. The pixel point that is not changed is not refreshed, thereby reducing the number of pixel point to be refreshed. In this way, transmission of data is reduced, and thereby image refresh speed is improved, refresh delay is reduced, and stuck of the display picture is prevented.

BRIEF DESCRIPTION OF DRAWINGS

In order to illustrate the technical solutions in the embodiments of the present disclosure or the prior art more clearly, the drawings required to be used in the content of the embodiments or the prior art will be introduced briefly as following. Obviously, the drawings described in the following are merely a part of the drawings of the present disclosure, and for those of ordinary skill in the art, other drawings may also be obtained according to the provided drawings without any creative labor.

DETAILED DESCRIPTIONS

The technical solution in the embodiments of the present disclosure will be described in combination with the drawings in the embodiments of the present disclosure. Obviously, the described embodiments are merely a part of the embodiments of the present disclosure, but not all of the embodiments of the present disclosure. Based on the embodiments in the present disclosure, all other embodiments obtained by those skilled in the art without creative labor fall within the protection scope of the present disclosure.

As for refreshing of the display image, it is needed to refresh each pixel point by a progressive row by row scanning manner. Thus, in cases that there are many pixel points, the data volume is large, which leads to circumstances that refresh efficiency is slow, refresh delay is prone to occur, and the display picture is prone to be stuck.

Figure 1:
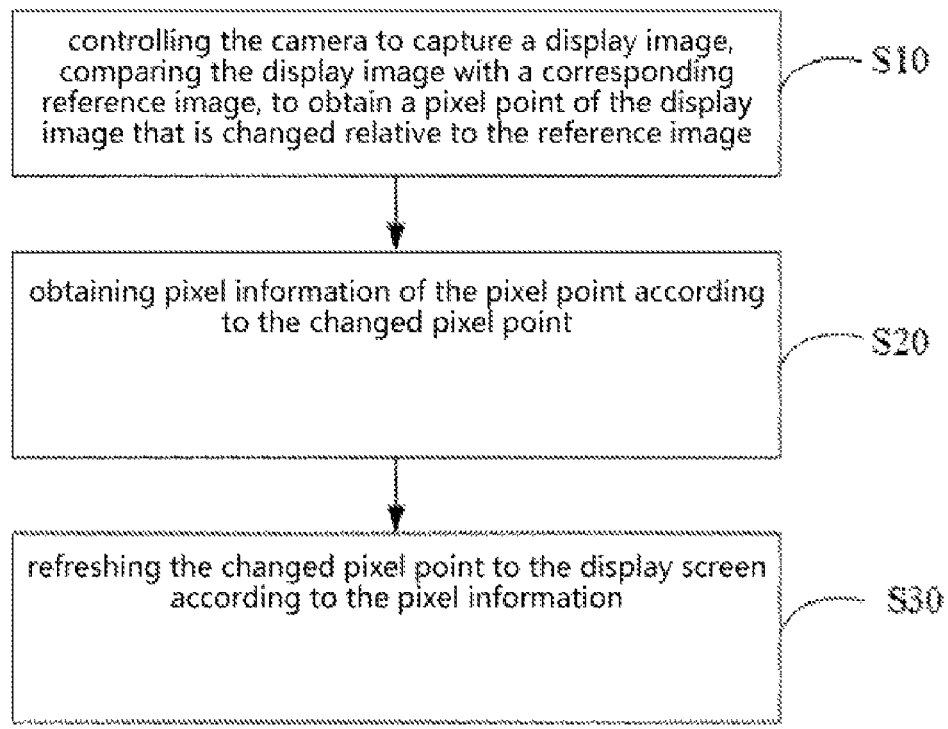
FIG. 1 is a schematic flowchart of a first embodiment of the image display method of the present disclosure.

In order to solve the above problems, referring to FIG. 1, a first embodiment of the present disclosure provides an image display method for refreshing images by the display screen. In some embodiments, this image display method may be used in a headset display device, for example, an AR (Augmented Reality) display device and a VR (Virtual Reality) display device. Wherein, the headset display device comprises a camera and a display screen, the camera is used for capturing a display image to be displayed by the display screen, the display image or a part of the display image is transmitted to the display screen for displaying. The image display method comprises:

Step S10, obtaining a display image, comparing the display image with a corresponding reference image, to obtain a pixel point of the display image that is changed relative to the reference image.

In some embodiments, the camera is controlled to capture an image out of the headset display device to obtain the display image. The reference image may be a previous frame image of the display image captured by the camera, that is, the reference image is also a frame image captured by the camera.

The display image is one frame of image, generally, the display image is displayed frame by frame, and it is also configured to refresh a whole frame of image on the display screen. A reference image is a reference for comparing with the display image, wherein the pixel points of the display image and the pixel points of reference image have the same amount and arrangements. That is to say, picture size of the display image and picture size of the reference image are the same. The reference image is the reference standard. By comparing the display image with the reference image, it is possible to obtain the pixel points of the display image that are changed relative to the reference image, as well as the pixel points that are not changed. When refreshing the image, only the changed pixel points are needed to be refreshed, and the display image for the pixel points which remain unchanged can be displayed on the display screen.

Step S20, obtaining pixel information of the pixel point according to the changed pixel point. The pixel points are arranged in rows and columns, and each of the pixel points has a corresponding position coordinate. Each of the pixel points may also display different brightness and color, wherein the brightness and the color may be represented by specific numerical values, that is, pixel values. For example, the brightness may be represented by grayscale values, range from 0 to 255, wherein 0 represents black and 255 represents white. The numerical values representing red, green, and blue colors are also included in the pixel value.

Step S30, refreshing the changed pixel point to the display screen according to the pixel information. The pixel information comprises a position coordinate and a pixel value of the pixel point that is needed to be refreshed. The pixel value of the pixel point at corresponding position is refreshed to a new pixel value by obtaining these pixel information, thereby the refreshing and displaying of the display image on the display screen is completed.

In the technical solution proposed in this embodiment, the pixel point of the display image that is changed relative to the reference image is obtained by comparing the display image captured by the camera with the reference image. After obtaining the pixel information of the changed pixel point, only the changed pixel point is refreshed according to the pixel information when refreshing the display screen. The pixel point that is not changed is not refreshed, thereby reducing the number of pixel point to be refreshed. In this way, transmission of data is reduced, and thereby image refresh speed is improved, refresh delay is reduced, and stuck of the display picture is prevented.

Figure 2:
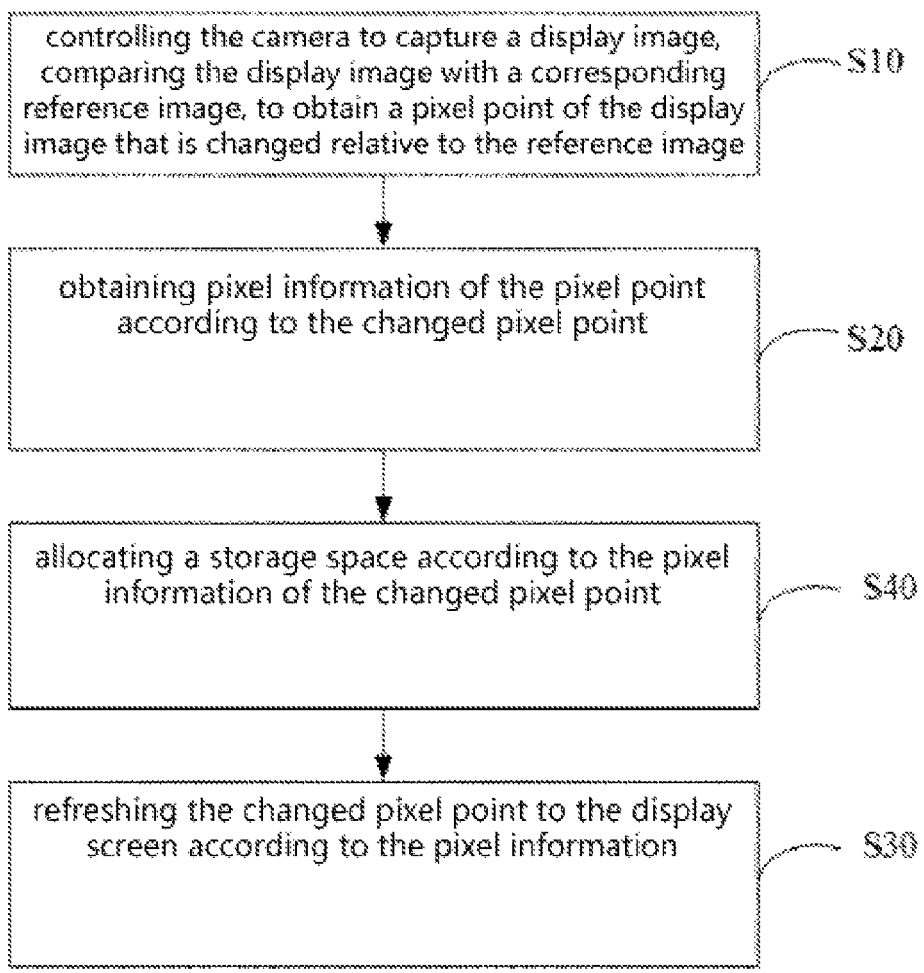
FIG. 2 is a schematic flowchart of a second embodiment of the image display method of the present disclosure.

Referring to FIG. 2, a second embodiment of the present disclosure is proposed based on the first embodiment of the present disclosure. When refreshing images on the display screen, it is needed to store the information on the image of each frame into an allocated storage space, and then display the stored image information on the entire screen by a progressive row by row scanning manner. Storing the data information of the entire image in this way occupies a large storage space. Thus, after the step of obtaining pixel information of the pixel point according to the changed pixel point, the image display method comprises:

Step S40, allocating a storage space according to the pixel information of the changed pixel point. That is, only after obtaining the pixel information of the changed pixel point, the storage space is adaptively allocated, the storage space can be used as long as it can match the pixel information of the changed pixel point.

Step S41, storing the pixel information of the changed pixel point to the storage space. That is, in this embodiment, only the pixel information of the changed pixel point is stored, and the corresponding information of the pixel point that is not changed is not needed to be stored, thus the stored data volume decreases and thereby the storage space is saved.

Furthermore, as the stored data decreases, the speed of extraction also increases when extracting data, thereby reducing the stuck and delay of the display picture.

Figure 3:
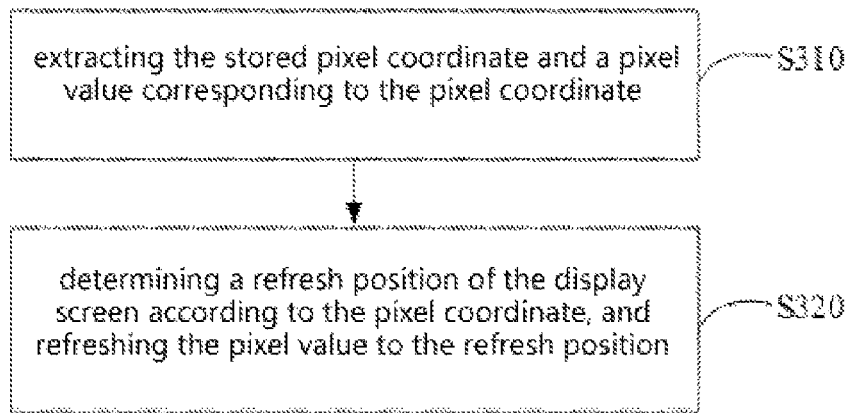
FIG. 3 is a schematic flowchart of a third embodiment of the image display method of the present disclosure.

Referring to FIG. 3, a third embodiment of the present disclosure is proposed based on the second embodiment of the present disclosure. The pixel information comprises a pixel coordinate and a pixel value corresponding to the pixel coordinate. The pixel coordinate records the position corresponding to the pixel point, and the pixel value represents color and brightness displayed by the corresponding pixel point. Wherein the pixel coordinate is determined according to the changed pixel point on a predetermined position of the display screen.

The step of refreshing the changed pixel point to the display screen according to the pixel information comprises:

Step S310, extracting the stored pixel coordinate and the pixel value corresponding to the pixel coordinate. The pixel information is stored in a storage space, and the pixel information is extracted from the storage space when refreshing the display screen.

Step S320, determining a refresh position of the display screen according to the pixel coordinate, and refreshing the pixel value to the refresh position. Since the pixel information comprises the pixel coordinate and the pixel value corresponding to a pixel coordinate, the position of the changed pixel point, that is, the predetermined refresh position on the display screen, is determined and obtained by the pixel coordinate. After determining the position of the changed pixel point, the pixel value is assigned to the corresponding pixel point. It may also be understood to replace the original pixel value with a new pixel value. The number of the changed pixel point is not limited to one, and there might be a plurality of changed pixel points. The refreshing of these pixel points is also performed by the progressive row by row scanning manner, and the refreshing is performed sequentially according to the changed pixel points.

Figure 4:
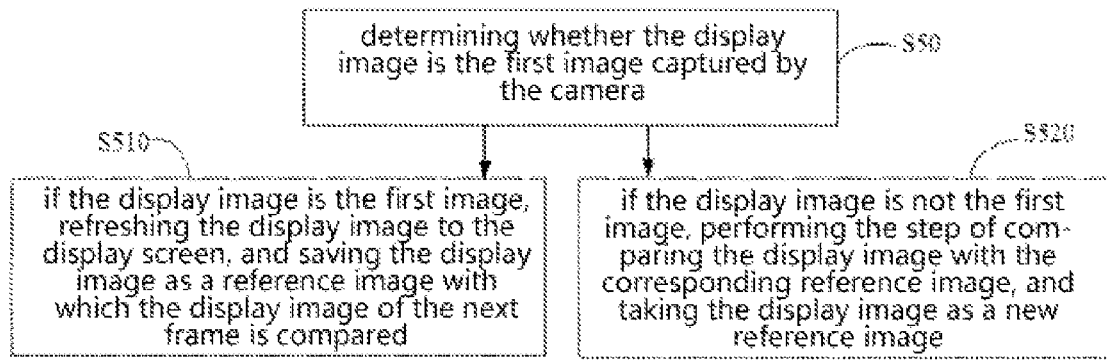
FIG. 4 is a schematic flowchart of a fourth embodiment of the image display method of the present disclosure.

Referring to FIG. 4, a fourth embodiment of the present disclosure is proposed based on the first embodiment of the present disclosure. After the step of controlling the camera to capture a display image, the image display method comprises:

Step S50, determining whether the display image is the first image captured by the camera. The first image may be a first image captured by the camera after the camera is activated, or the first image is a first image captured by the camera after the headset display device activates a predetermined function (for example, a Video See Through function), or the first image is a first image captured by the camera after the headset display device is in a posture within a predetermined range.

Step S510, if the display image is the first image, refreshing the display image to the display screen, and saving the display image as a reference image with which the display image of the next frame is compared. It can be understood that there is no reference image at this time, thus after refreshing the first image to the display screen, the first image is stored as the reference image. After obtaining the display image of the next frame, the first image is taken as the reference with which the display image of the next frame is compared.

Step S520, if the display image is not the first image, comparing the display image with the corresponding reference image, and taking the display image as a new reference image. After determining that the display image is not the first image, that is to say, there is already a reference image displayed on the display screen, thus after refreshing the display image to the display screen, the image on the display screen has changed. At this point, as for the display image of the next frame, the reference has changed. Therefore, the refreshed display image is taken as the new reference image, the process is repeated in this way, to ensure that the display picture of the display screen can be smoothly and continuously updated.

Figure 5:
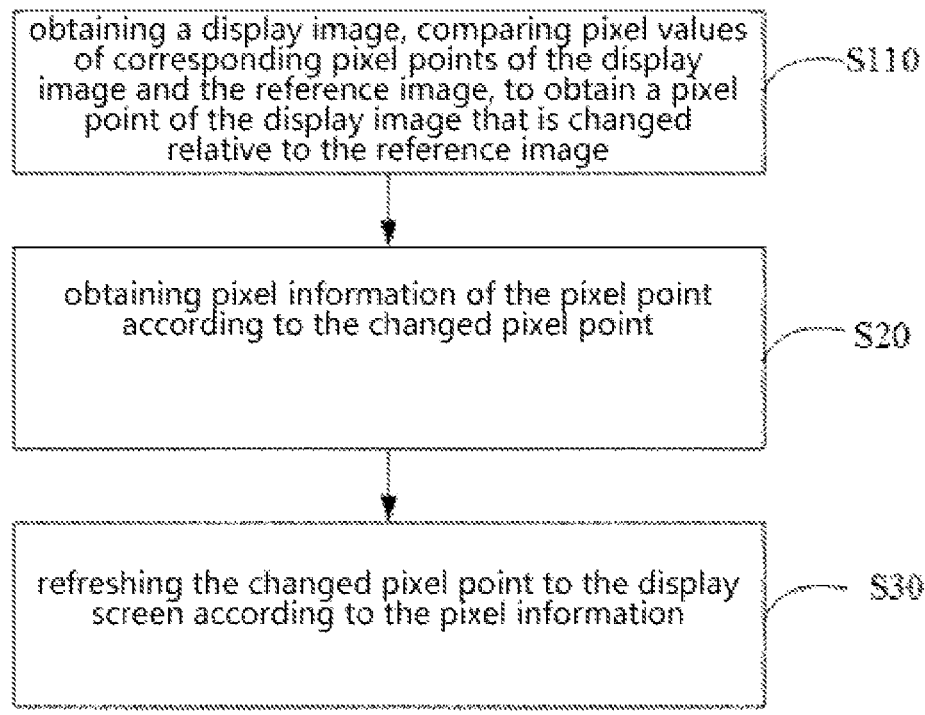
FIG. 5 is a schematic flowchart of a fifth embodiment of the image display method of the present disclosure.

Referring to FIG. 5, a fifth embodiment of the present disclosure is proposed, wherein the step of comparing the display image with a corresponding reference image comprises:

Step S110, comparing pixel values of corresponding pixel points of the display image and the reference image. The pixel points included in the display image and the reference image have the same number, and the positions of the pixel points also correspond one by one between the display image and the reference image. In order to distinguish the different pixel points between the display image and the reference image, the corresponding pixel points of the display image and the reference image are compared one by one, to obtain the pixel value of the changed pixel point.

Figure 6:
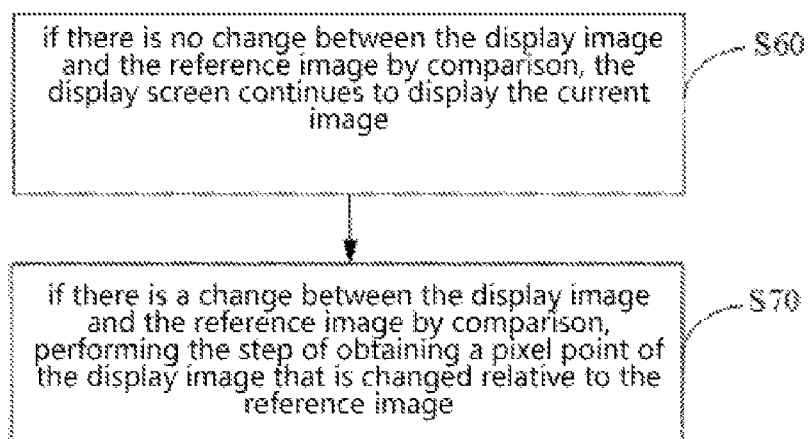
FIG. 6 is a schematic flowchart of a sixth embodiment of the image display method of the present disclosure.

Referring to FIG. 6, a sixth embodiment of the present disclosure is proposed. After the step of comparing the display image with the corresponding reference image, the image display method comprises:

Step S60, if there is no change between the display image and the reference image by comparison, the display screen continues to display the current image. The display picture is displayed frame by frame on the display screen. During the process of displaying the display picture on the display screen, usually, there is a circumstance where the content of the image displayed in the previous frame and subsequent frame is the same. In this case, it is no need to refresh the display screen, which further saves the storage space and further improves display efficiency.

Step S70, if there is a change between the display image and the reference image by comparison, performing the step of obtaining a pixel point of the display image that is changed relative to the reference image. After determining that there are different pixel values between the display image and the reference image, the pixel values of the different pixel points are refreshed to the display screen.

In the above embodiments of the present disclosure, before the step of controlling the camera to capture a display image, comparing the display image with a corresponding reference image, to obtain a pixel point of the display image that is changed relative to the reference image, the image display method may also perform the following steps:

monitoring whether the display image captured by the camera contains the changed pixel point, the changed pixel point means at least a pixel changed relative to that of the reference image; and reporting the pixel information of the changed pixel point to the system if the display image captured by the camera contains the changed pixel point.

In some embodiments, before monitoring the capturing of the camera, an 'Event' may be registered. After registering the 'Event', the monitoring operation is performed. If it is monitored that the display image contains the changed pixel point, the 'Event' is reported to the system. The 'Event' contains pixel information of the changed pixel point. After the system receiving the 'Event', the system allocates a storage space according to the pixel information of the pixel point. By means of such allocation of new storage space, system memory for the headset display device can be saved.

It should be noted that, in several embodiments, the step of comparing the display image with a corresponding reference image may be performed simultaneously with the step of controlling the camera to capture a display image, or the step of comparing the display image with a corresponding reference image may be performed immediately after the step of controlling the camera to capture a display image.

Besides, in several embodiments, after obtaining pixel information of the pixel point according to the changed pixel point, the camera also may be controlled to only transmit the pixel information of the changed pixel point to the storage. That is, there is no need to transmit the entire image captured by the camera, and only the pixel information of the changed pixel point need to be transmitted. In this way, frame rate of the camera can be improved.

In several embodiments of the present disclosure, a headset display device is also provided. The headset display device comprises a camera and a display screen, the camera is used for capturing a display image to be displayed by the display screen, and the display image is transmitted to the display screen for displaying. The headset display device further comprises a storage for storing program code of the image display method of the above embodiments and a processer for performing the steps in the above embodiments according to the program code.

Figure 7:
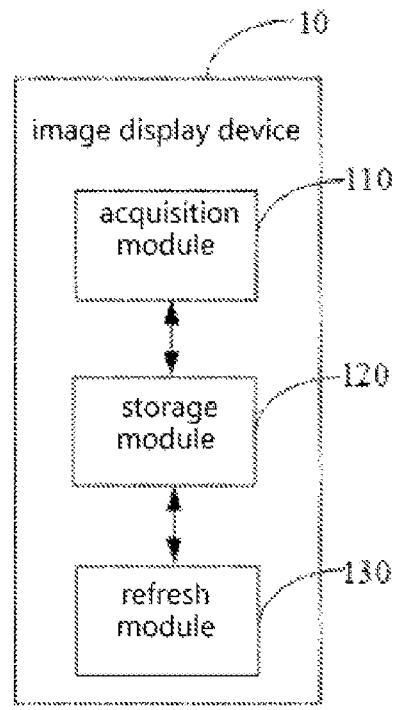
FIG. 7 is a schematic diagram of the structure of an image display device of the present disclosure.

Referring to FIG. 7, the present disclosure also provides an image display device 10, which comprises an acquisition module 110 and a refresh module 130.

The acquisition module 110 is used for obtaining a display image, comparing the display image with the corresponding reference image, to obtain a pixel point of the display image that is changed relative to the reference image.

The acquisition module may include a camera positioned on the headset display device, and specifically, the step of obtaining the display image may be the step of controlling the camera to capture a display image. The reference image may be a previous frame image of the display image captured by the camera, that is, the reference image is also a frame image captured by the camera.

The display image is one frame of image, generally, the display picture is displayed frame by frame, and it is also configured to refresh a whole frame of image on the display screen. A reference image is a reference for comparing with the display image, wherein the pixel points of the display image and reference image have the same number and arrangements. That is to say, picture sizes of the display image and the reference image are the same. The reference image is a reference standard. By comparing the display image with the reference image, it is possible to obtain the pixel points of the display image that are changed relative to the reference image, as well as the pixel points that are not changed. When refreshing the image, only the changed pixel points are needed to be refreshed, and the pixel points which remain unchanged may display the display image on the display screen.

The acquisition module 110 is also used for obtaining pixel information of the pixel point according to the changed pixel point. The pixel points are arranged in rows and columns, and each of pixel points has a corresponding position coordinate. Each of the pixel points may also display different brightness and color, wherein the brightness and the color may be represented by specific numerical values, that is, pixel values. For example, the brightness may be represented by grayscale values, range from 0 to 255, wherein 0 represents black and 255 represents white. The numerical values representing red, green, and blue colors are also included in the pixel value.

The refresh module 130 is used for refreshing the changed pixel point to the display screen according to pixel information. The pixel information comprises a position coordinate and a pixel value of the pixel point that needed to be refreshed. The pixel value of the pixel point at corresponding position is refreshed to a new pixel value by obtaining these pixel information, thereby the refreshing and displaying of the display image on the display screen is completed.

In the technical solution proposed in this embodiment, the pixel point of the display image that is changed relative to the reference image is obtained by comparing the display image captured by the camera with the reference image. After obtaining the pixel information of the changed pixel point, only the changed pixel point is refreshed according to the pixel information when refreshing the display screen. The pixel point that is not changed is not refreshed, thereby reducing the number of pixel point to be refreshed. In this way, transmission of data is reduced, and thereby the image refresh speed is improved, refresh delay is reduced, and stuck of the display picture is prevented.

In the above embodiments, when refreshing images on the display screen, it is needed to store the image information of each frame into an allocated storage space, and then display the stored image information on the entire screen by a progressive row by row scanning manner. Storing the data information of the entire image in this way occupies a large storage space. Thus, the image display device 10 further comprises a storage module 120.

The system allocates a storage space according to the pixel information of the changed pixel point. That is, only after obtaining the pixel information of the changed pixel point, the storage space is adaptively allocated. The storage space can be used as long as it can match the pixel information of the changed pixel point.

Subsequently, the storage module 120 is used to store pixel information of the changed pixel point to the storage space. That is, in this embodiment, only the pixel information of the changed pixel point is stored, and corresponding information of the pixel point that is not changed is not needed to be stored, thus the stored data amount decreases and thereby the storage space is saved.

Furthermore, as the stored data decreases, the speed of extraction also increases when extracting data, thereby reducing the stuck and delay of the display picture.

In the above embodiments, the pixel information comprises a pixel coordinate and a pixel value corresponding to a pixel coordinate. The pixel coordinate records the positions corresponding to the pixel point, and the pixel value represents the color and brightness displayed by the corresponding pixel point. Wherein, the pixel coordinate is determined according to a predetermined position of the changed pixel point on the display screen.

Figure 8:
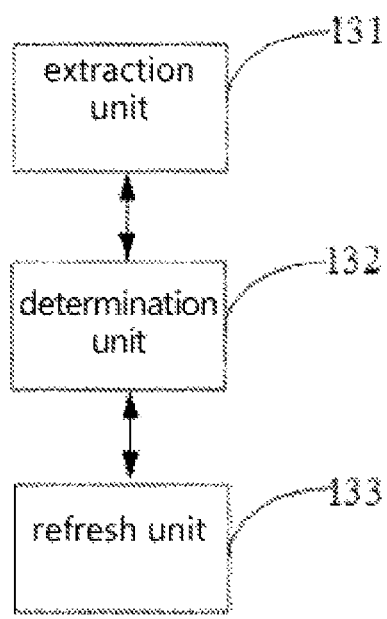
FIG. 8 is a schematic diagram of the structure of a refresh module in the image display device of the present disclosure.

Referring to FIG. 8, the refresh module 130 comprises an extraction unit 131, a determination unit 132 and a refresh unit 133.

The extraction unit 131 is used for extracting the stored pixel coordinate and the pixel value corresponding to the pixel coordinate. The pixel information is stored in a storage space, and the pixel information is extracted from the storage space when refreshing the display screen.

The determination unit 132 is used for determining a refresh position of the display screen according to the pixel coordinate. Since the pixel information comprises the pixel coordinate and the pixel value corresponding to a pixel coordinate, the position of the changed pixel point, that is, the predetermined refresh position on the display screen, is determined and obtained by the pixel coordinate.

The refresh unit 133 is used for refreshing the pixel value to the refresh position. After determining the position of the changed pixel point, the pixel value is assigned to the corresponding pixel point. It may also be understood to replace the original pixel value with a new pixel value. The number of the changed pixel point is not limited to one, and there might be a plurality of changed pixel points. The refreshing of these pixel points is also performed by the progressive row by row scanning manner, and the refreshing is performed sequentially according to the changed pixel points.

The present disclosure also provides a computer readable storage medium on which an image display program is stored. When the image display program is executed by the processor, the image display method as described above is implemented.

The various embodiments in the present disclosure are described in a parallel or progressive manner, and each embodiment focuses on the differences from other embodiments. The same or similar parts between each embodiment may be referred to each other. As for the device disclosed in the embodiment, the description is relatively simple since it corresponds to the method disclosed in the embodiment. The relevant information may refer to the description for method.

Those skilled in the art may also understand that the units and algorithm steps of each example described in combination with the embodiments disclosed herein may be implemented in electronic hardware, computer software or a combination of the both. In order to clearly illustrate the interchangeability of hardware and software, the composition and the steps of each example have been described generally in terms of function in the above descriptions. Whether these functions are executed in hardware or software depends on the specific application and design constraints of the technical solution. Those skilled in the art may use different methods to implement the described functions for each specific application, but such implementation should not be considered beyond the scope of the present disclosure.

The steps of the method or algorithm described in combination with the embodiments disclosed by the present disclosure may be directly implemented using hardware, software modules executed by processors or a combination of the both. The software modules may be placed in random access memory (RAM), memory, read-only memory (ROM), electrically programmable ROM, electrically erasable programmable ROM, register, hard disk, removable disk, CD-ROM, or any other form of storage medium known in the technical field.

It should also be noted that herein, relational terms such as first and second are only used to distinguish one entity or operation from another entity or operation, and do not necessarily require or imply any actual relationship or order between these entities or operations. Moreover, the terms "comprise", "include" or any other variation thereof are intended to encompass non-exclusive inclusion, such that a process, method, object or device that comprises a series of elements not only comprises those elements, but also comprise other elements that are not explicitly listed, or also comprise elements inherent in such a process, method, object or device. Without further limitations, the elements limited by the statement "comprising one . . . " do not exclude the existence of other identical elements in the process, method, object or device that comprises the elements.

What is claimed is:

1. An image display method applied to a headset display device, wherein the headset display device comprises a camera and a display screen, the camera is used for capturing a display image to be displayed by the display screen, the image display method comprising following steps:
controlling the camera to capture a display image, comparing the display image with a corresponding reference image, to obtain a pixel point of the display image that is changed relative to the reference image, wherein the reference image is a previous frame image of the display image captured by the camera;
obtaining pixel information of the pixel point according to the changed pixel point; and
refreshing the changed pixel point to the display screen according to the pixel information.

2. The image display method of claim 1, wherein after the step of obtaining pixel information of the pixel point according to the changed pixel point, the image display method comprises following steps:
allocating a storage space according to the pixel information of the changed pixel point; and
storing the pixel information of the changed pixel point to the storage space.

3. The image display method of claim 1, wherein before the step of controlling the camera to capture a display image, comparing the display image with a corresponding reference image, to obtain a pixel point of the display image that is changed relative to the reference image, the image display method comprises following steps:
monitoring whether the display image captured by the camera contains the changed pixel point; and
reporting the pixel information of the changed pixel point if the display image captured by the camera contains the changed pixel point.

4. The image display method of claim 3, wherein before the step of monitoring whether the display image captured by the camera contains the changed pixel point, the image display method further comprises following steps:
registering an 'Event', which is used to monitor whether the display image captured by the camera contains the changed pixel point.

5. The image display method of claim 3, wherein the pixel information comprises a pixel coordinate and a pixel value corresponding to the pixel coordinate, and wherein the pixel coordinate is determined according to a predetermined position of the changed pixel point on the display screen, and
wherein the step of refreshing the changed pixel point to the display screen according to the pixel information comprises:
extracting the stored pixel coordinate and the pixel value corresponding to the pixel coordinate; and
determining a refresh position of the display screen according to the pixel coordinate, and refreshing the pixel value to the refresh position.

6. The image display method of claim 1, wherein the step of comparing the display image with a corresponding reference image is performed simultaneously with the step of controlling the camera to capture a display image, or the step of comparing the display image with a corresponding reference image is performed immediately after the step of controlling the camera to capture a display image.

7. The image display method of claim 1, wherein after obtaining pixel information of the pixel point according to the changed pixel point, the image display method comprises following steps:
controlling the camera to only transmit the pixel information of the changed pixel point to the storage.

8. The image display method of claim 1, wherein after the step of controlling the camera to capture a display image, the image display method comprises following steps:
determining whether the display image is the first image;
if the display image is the first image captured by the camera, refreshing the display image to the display screen, and saving the display image as a reference image with which the display image of the next frame is compared; and
if the display image is not the first image, performing the step of comparing the display image with a corresponding reference image, and taking the display image as a new reference image.

9. The image display method according to claim 8, wherein the first image is a first image captured after the camera is activated, or
the first image is a first image captured by the camera after the headset display device activates a predetermined function, or
the first image is a first image captured by the camera after the headset display device is in a posture within a predetermined range.

10. The image display method according to claim 1, wherein after the step of comparing the display image with a corresponding reference image, the image display method comprises:
if there is no change between the display image and the reference image by comparison, the display screen continues to display the current image; and
if there is a change between the display image and the reference image by comparison, performing the step of obtaining the pixel point of the display image that is changed relative to the reference image.

11. A headset display device, wherein the headset display device comprises a camera and a display screen, the camera is used for capturing a display image to be displayed by the display screen, the headset display device further comprises a storage for storing program code and a processor for performing following operations according to the program code:

controlling the camera to capture a display image, comparing the display image with a corresponding reference image, to obtain a pixel point of the display image that is changed relative to the reference image, wherein the reference image is a previous frame image of the display image captured by the camera; and obtaining pixel information of the pixel point according to the changed pixel point; and refreshing the changed pixel point to the display screen according to the pixel information.

12. The headset display device of claim 11, wherein the processor is also used for:

after the step of obtaining pixel information of the pixel point according to the changed pixel point, allocating a storage space according to the pixel information of the changed pixel point; and storing the pixel information of the changed pixel point to the storage space.

13. The headset display device of claim 11, wherein the processor is also used for:

before the step of controlling the camera to capture a display image, comparing the display image with a corresponding reference image, to obtain a pixel point of the display image that is changed relative to the reference image, monitoring whether the display image captured by the camera contains the changed pixel point; and reporting the pixel information of the changed pixel point if the display image captured by the camera contains the changed pixel point.

14. The headset display device of claim 13, wherein the processor is also used for:

before monitoring whether the display image captured by the camera contains the changed pixel point, registering an 'Event', which is used to monitor whether the display image captured by the camera contains the changed pixel point.

15. The headset display device of claim 13, wherein the pixel information comprises a pixel coordinate and a pixel value corresponding to the pixel coordinate, wherein the pixel coordinate is determined according to a predetermined position of the changed pixel point on the display screen, and wherein the processer is also used for:

extracting the stored pixel coordinate and the pixel value corresponding to the pixel coordinate;

determining a refresh position of the display screen according to the pixel coordinate; and refreshing the pixel value to the refresh position.

16. The headset display device of claim 11, wherein the step of comparing the display image with a corresponding reference image is performed simultaneously with the step of controlling the camera to capture a display image, or the step of comparing the display image with a corresponding reference image is performed immediately after the step of controlling the camera to capture a display image.

17. The headset display device of claim 11, wherein the processor is also used for:

after obtaining pixel information of the pixel point according to the changed pixel point, controlling the camera to only transmit the pixel information of the changed pixel point to the storage.

18. The headset display device of claim 11, wherein the processor is also used for:

after controlling the camera to capture the display image, determining whether the display image is the first image;

if the display image is the first image captured by the camera, refreshing the display image to the display screen, and saving the display image as a reference image with which the display image of the next frame is compared; and if the display image is not the first image, performing the step of comparing the display image with a corresponding reference image, and taking the display image as a new reference image.

19. The headset display device according to claim 18, wherein the first image is a first image captured after the camera is activated, or the first image is a first image captured by the camera after the headset display device activates a predetermined function, or the first image is a first image captured by the camera after the headset display device is in a posture within a predetermined range.

20. A non-transitory computer readable storage medium on which an image display program is stored, and when the image display program is executed by a processor, the image display method of claim 1 is implemented.

* * * * *